(12) United States Patent
Collins (10) Patent No.: US 7,494,169 B2
(45) Date of Patent: Feb. 24, 2009

(54) CARGO SUPPORT FOR TRUCK

(76) Inventor: Ben K. Collins, 2700 Belvedere Ave., Charlotte, NC (US) 28205

( * ) Notice: Subject to any disclaimer, the term of this patent is extended or adjusted under 35 U.S.C. 154(b) by 353 days.

(21) Appl. No.: 11/421,226

(22) Filed: May 31, 2006

(65) Prior Publication Data

US 2007/0278810 A1 Dec. 6, 2007

(51) Int. Cl.
*B60P 3/00* (2006.01)
(52) U.S. Cl. .......................................................... 296/3
(58) Field of Classification Search ............... 296/3, 296/50, 51, 26.01, 26.08; 211/195
See application file for complete search history.

(56) References Cited

U.S. PATENT DOCUMENTS

| | | | | |
|---|---|---|---|---|
| 2,570,802 A | * | 10/1951 | Hatteburg | 224/405 |
| 2,711,342 A | * | 6/1955 | Selzer | 296/32 |
| 2,729,499 A | | 1/1956 | Eggum | |
| 2,807,497 A | | 9/1957 | Nepple | |
| 2,947,566 A | * | 8/1960 | Tower | 296/10 |
| 3,891,262 A | | 6/1975 | Brunel | |
| 4,138,046 A | | 2/1979 | De Freze | |
| 4,659,131 A | * | 4/1987 | Flournoy, Jr. | 296/3 |
| 5,037,152 A | | 8/1991 | Hendricks | |
| 5,108,141 A | | 4/1992 | Anderson | |
| 5,190,337 A | * | 3/1993 | McDaniel | 296/3 |
| 5,431,472 A | | 7/1995 | Coffland | |
| 5,439,152 A | * | 8/1995 | Campbell | 224/405 |
| 5,476,301 A | | 12/1995 | Berkich | |
| 5,560,666 A | * | 10/1996 | Vieira et al. | 296/3 |
| 6,343,826 B2 | * | 2/2002 | Bohannon | 296/26.08 |
| 6,364,392 B1 | | 4/2002 | Meinke | |
| 6,698,810 B1 | | 3/2004 | Lane | |
| 6,761,387 B2 | | 7/2004 | Sloss | |
| 6,935,671 B2 | * | 8/2005 | Bruford et al. | 296/57.1 |
| 6,983,968 B2 | * | 1/2006 | Brauer et al. | 296/3 |
| 6,991,277 B1 | * | 1/2006 | Esler | 296/50 |
| 7,204,537 B1 | * | 4/2007 | Oh et al. | 296/26.09 |
| 7,234,749 B1 | * | 6/2007 | Firzlaff et al. | 296/57.1 |
| 2003/0127875 A1 | | 7/2003 | Hornick | |

FOREIGN PATENT DOCUMENTS

DE 3138338 A1 * 4/1983 ............ 296/36

* cited by examiner

*Primary Examiner*—H Gutman
(74) *Attorney, Agent, or Firm*—Alston & Bird LLP (57) ABSTRACT

A cargo support apparatus for a truck bed includes a forward support assembly capable of being at least partially stowed within the front wall of the truck bed and a rear support assembly capable of being at least partially stowed within the tailgate. The forward and rear support assemblies include respective horizontal support members for supporting cargo above the truck bed. The forward and rear support assemblies may be capable of assuming stowed and deployed configurations independently of each other. The support assemblies can include telescoping members for elevating the horizontal support members. Raised stop members may be included to prevent cargo from sliding from the horizontal members.

20 Claims, 6 Drawing Sheets

CARGO SUPPORT FOR TRUCK

FIELD OF THE INVENTION

The present invention relates to cargo supports for trucks, and more particularly relates to cargo supports that increase the dimensional capacities of trucks when deployed and assume low-profile configurations when stowed.

BACKGROUND OF THE INVENTION

Automotive trucks, often called pick-up trucks, are popular vehicles for use in personal and professional transportation applications. Historically, a typical pick-up truck was designed to accommodate two or three passengers because the majority of the vehicle was dedicated to the transport of large bulky items in the open cargo bed of the truck. However, some new designs, which have increased capacities for passengers, provide additional rows of seats and additional passenger doors. Although their cargo beds are diminished to accommodate their larger passenger cabs, pick-up trucks having spacious passenger cabs with four passenger doors, for example, have become popular.

Small-business owners and contractors fairly typically appreciate the versatility these vehicles offer. For example, a single truck can be used in transporting work related items during working hours, then be used for transporting family members and friends during evening hours, and then be used for transporting recreation related items for weekend trips. Typical work related items include ladders, lumber, piping supplies, and dry-wall sheets. Typical recreation related items include kayaks, canoes, snow skis, water skis, and fishing poles. Such items often do not fit well within the dimensions of a truck.

Fixed racks are available for semi-permanent installation in and above the bed of a truck. Such racks well serve the needs of contractors and craftsmen who have a vehicle dedicated to work applications. However, such racks are considered by some to be unsightly. Some neighborhood associations discourage and regulate the parking of dedicated work-related trucks. Some truck owners prefer racks that fold or collapse so that the appearance of a truck useful for carrying long items such as ladders can be aesthetically restored when the vehicle is parked in residential areas and used for trips to parties and theatres.

While typical folding and collapsing racks may serve to transform the aesthetics of a truck when the racks are stowed into low-profile configurations, the racks typically consume space within the cargo bed of the truck and diminish the capacity of the cargo bed. For example, some racks have collapsible vertical support members that are disposed within the cargo bed of a truck at the corners of the bed. Some racks have horizontal members that compromise access to the cargo bed through the tailgate of the truck.

Therefore, racks and other fixtures are needed to extend the versatilities of trucks by increasing the effective dimensional capacities of their cargo beds. There is a need for a utility rack that is capable of supporting objects above the cargo bed and passenger cab of a truck. There is a need for a utility rack that can conveniently assume a stowed configuration while allowing full use of the bed of a truck. There is a need for a rack that integrates aesthetically with a truck when a stowed configuration is assumed.

BRIEF SUMMARY OF THE INVENTION

Embodiments of the present invention may address the above needs and achieve other advantages. For example, a first aspect of the invention relates to a cargo support apparatus having forward and rear support assemblies. In the embodiments described herein, the forward support assembly is capable of assuming a stowed configuration at least partially disposed within a front wall of a truck bed, and the rear support assembly is capable of assuming a stowed configuration at least partially disposed within the tailgate of the truck bed. The forward and rear support assemblies include respective horizontal support members for supporting cargo when deployed configurations are assumed. The forward and rear support assemblies can include elevating members such as telescoping members. In some embodiments, the forward and rear support assemblies are capable of assuming their stowed and deployed configurations independently of each other. Furthermore, the forward and rear support assemblies may each include stop members for preventing supported cargo from sliding.

A second aspect of the invention relates to a cargo bed for an automobile. In the embodiments described herein, the cargo bed includes a fixed vertical forward wall, a rear tailgate, a forward support assembly connected to the forward wall, and a rear support assembly connected to the tailgate. The forward and rear support assemblies include respective pairs of elevating members and respective horizontal support members. The forward elevating members are capable of being disposed at least partially within the fixed forward wall, and the rear elevating members are capable of being disposed at least partially within the rear tailgate. The forward and rear elevating members are capable of being extended such that the forward and rear horizontal support members are extended respectively from the forward wall and tailgate. In some embodiments, the forward wall and tailgate each define a respective channel in which the forward and rear support assemblies can be at least partially received.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
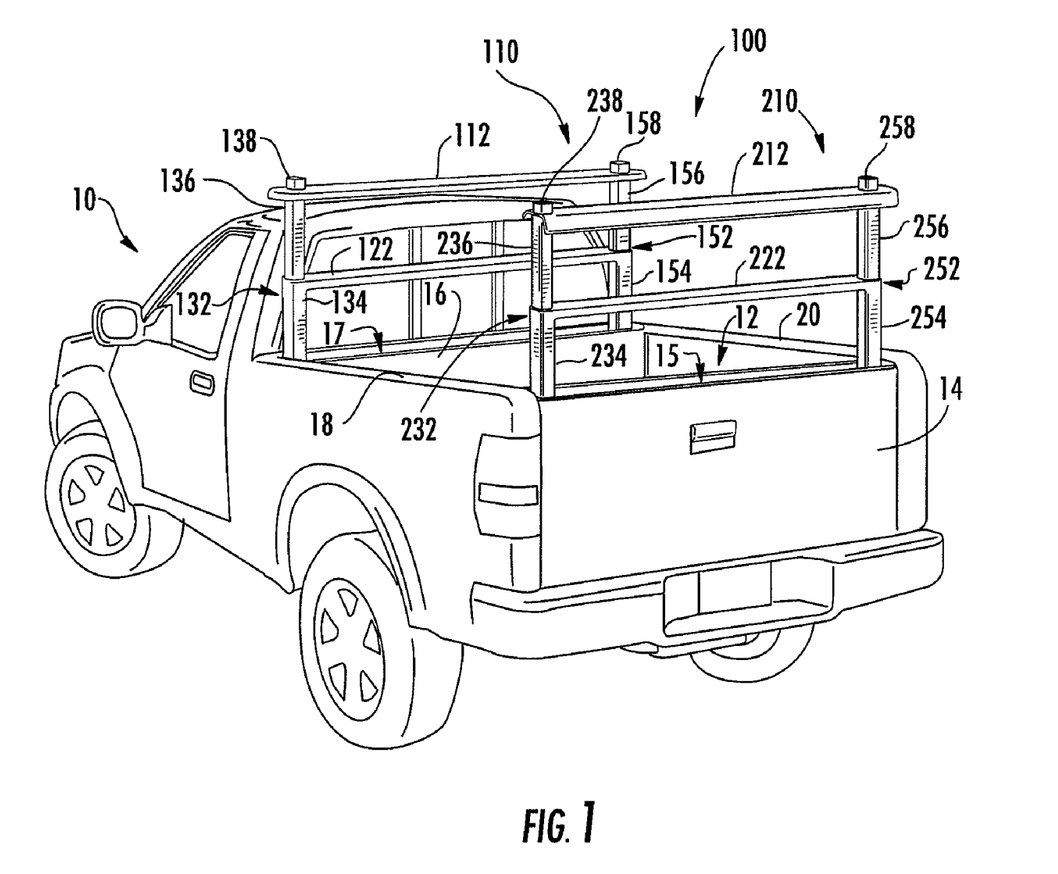
FIG. 1 is a perspective view of a cargo support apparatus, according to an embodiment of the invention, assuming a deployed configuration for supporting items above the cargo bed of a truck.
Figure 2A:
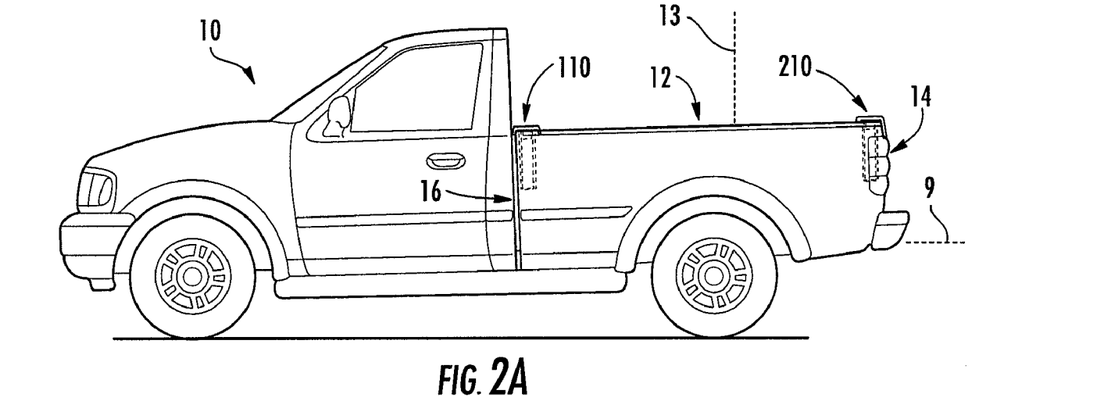
FIG. 2A is a side elevation view of the cargo support apparatus of FIG. 1 assuming a stowed configuration within the front wall and tailgate of the cargo bed of the truck.
Figure 2B:
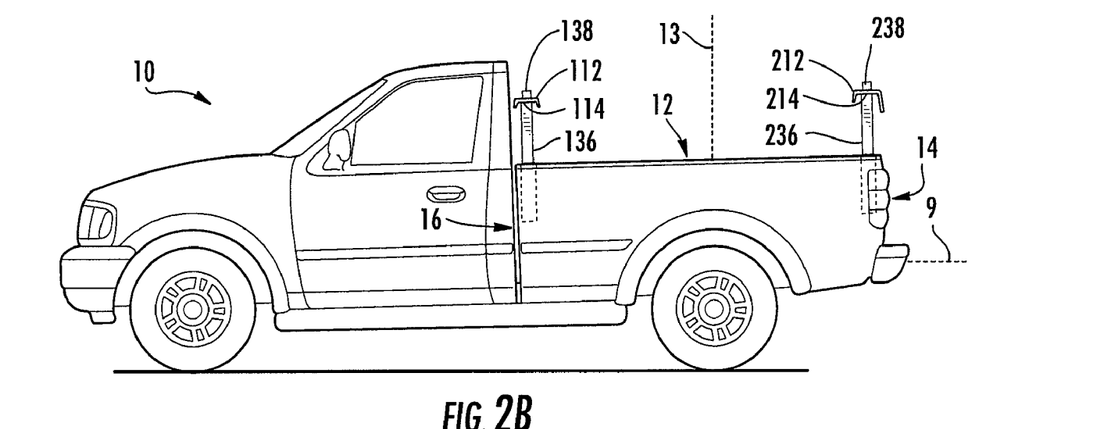
FIG. 2B is a side elevation view of the cargo support apparatus of FIG. 1 assuming a deployed configuration such that support members assume vertical positions above the cargo bed of the truck.
Figure 2C:
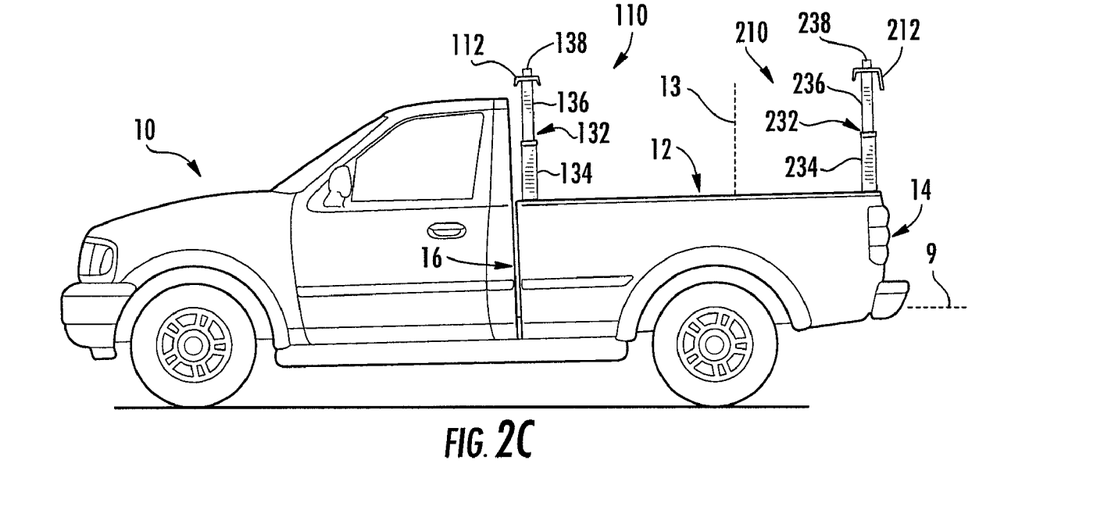
FIG. 2C is side elevation view of the cargo support apparatus of FIG. 1 assuming a further deployed configuration such that support members assume vertical positions higher than the passenger cab of the truck.
Figure 3:
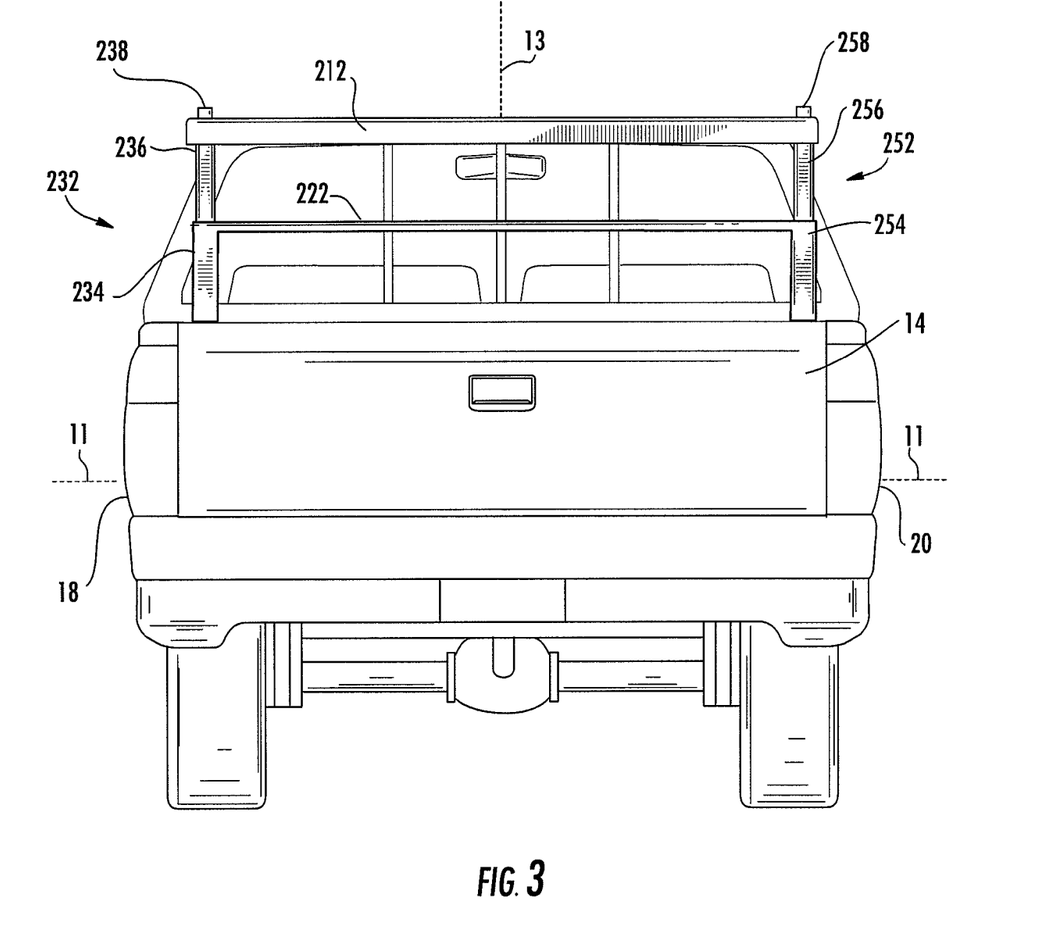
FIG. 3 is a rear elevation view of the cargo support apparatus shown assuming the further deployed configuration of FIG. 2C.
Figure 4:
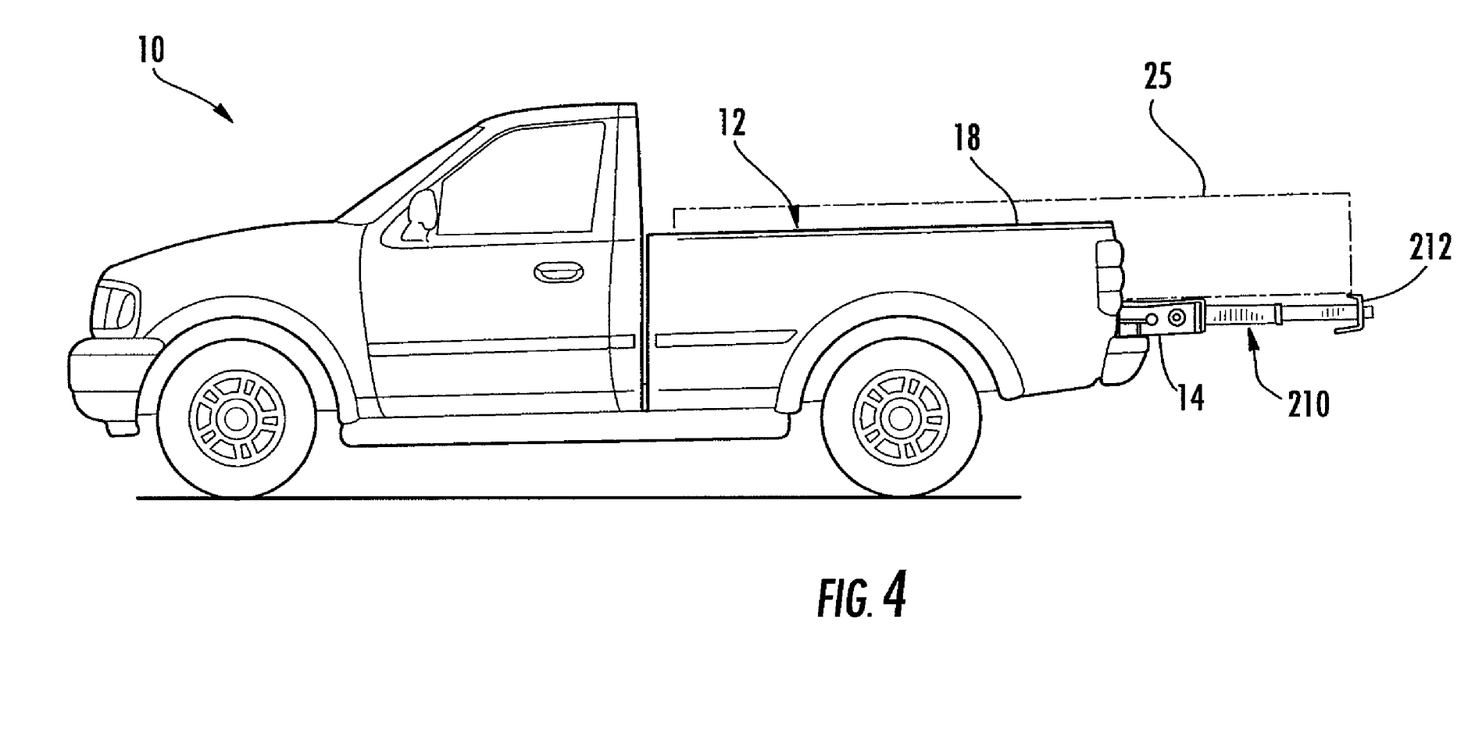
FIG. 4 is a side elevation view of a rear support assembly, according to an embodiment of the invention, assuming a deployed configuration extending from a horizontally disposed tailgate of a truck.

A cargo support apparatus 100 according to an embodiment of the invention, as illustrated in FIGS. 1-3, comprises a forward support assembly 110 and a rear support assembly 210. A truck 10 is shown having a cargo bed 12 defined along the longitudinal travel axis 9 (FIGS. 2A-2C) between a laterally disposed pivoting rear tailgate 14 and a laterally disposed fixed vertical front wall 16. The cargo bed is defined along a lateral axis 11 (FIG. 3), which is perpendicular to the longitudinal travel axis 9, between a left longitudinal wall 18 and a right longitudinal wall 20. The tailgate is capable of assuming a vertical disposition as shown in FIG. 1 such that the bed 12 is surrounded by the tailgate 14 and the three walls 16, 18, and 20. The tailgate is further capable of pivoting to assume a horizontal disposition as shown in FIG. 4 such that the bed 12 may be loaded with items passed conveniently into the bed across the horizontal tailgate. The tailgate furthermore serves to increase the effective floor capacity of the cargo bed when assuming the horizontal disposition of FIG. 4 so that items longer than the longitudinal walls 18 and 20 can be carried by the truck 10.

As shown in FIG. 1, the forward support assembly 110 comprises a forward horizontal support member 112 that is disposed above the front wall 16 for supporting items above the front wall or otherwise expanding the dimensional capacities of the bed 12. The forward support assembly is shown having assumed a deployed configuration in FIGS. 1 and 2C such that the forward horizontal support member 112 is disposed above the front wall, vertically spaced from the front wall. The forward support assembly is also capable of assuming a stowed configuration, as shown in FIG. 2A, such that the forward support assembly is disposed at least partially within the front wall. Thus, the forward support assembly can be deployed as shown in FIG. 1 to serve in supporting cargo items such as ladders and kayaks above the front wall, and can assume a stowed configuration as shown in FIG. 2A to minimize the appearance of the assembly and to reduce aerodynamic drag on the forward support assembly when the truck 10 travels.

The forward support assembly comprises a forward pair of elevating assemblies 132 and 152 (FIG. 1) that are spaced from each other along the lateral axis 11 (FIG. 3). The elevating assemblies 132 and 152 are at least partially disposed within the front wall 16 when the forward support assembly assumes the stowed configuration as shown in FIG. 2A. The forward elevating assemblies comprise respective telescoping members. That is, the left forward elevating assembly 132 comprises a first elevating member 134, a second elevating member 136, and an upper most stop member 138, which members are configured to telescopically expand (FIG. 2C) and collapse (FIG. 2A) the left forward elevating assembly. Similarly, the right forward elevating assembly 152 comprises a first elevating member 154, a second elevating member 156, and an upper-most stop member 158, which members are configured to telescopically expand (FIG. 2C) and collapse (FIG. 2A) the right forward elevating assembly.

When the forward support assembly 110 assumes the stowed configuration as shown in FIG. 2A, the left and right first elevating members 134 and 154 are at least partially received by the front wall 16 of the cargo bed 12, the left and right second elevating members 136 and 156 are respectively received at least partially by the left and right first elevating members, and the upper-most left and right stop members 138 and 158 are respectively received at least partially by the left and right second elevating members. The forward horizontal support member 112 is connected to upper margins of the left and right second elevating members 136 and 156 and travels at least vertically as the forward support assembly is stowed and deployed.

In the illustrated embodiment, the forward support assembly 110 is capable of assuming a plurality of deployed configurations such that the forward horizontal support member 112 can be disposed in a plurality of positions along a vertical axis 13 above the cargo bed 12. For example, in FIG. 2B the second elevating members are telescopically extended from the first elevating members to dispose the forward horizontal support member in a vertical position raised over the front wall 16. In FIG. 2C, the first elevating members are extended from the front wall to further elevate the forward horizontal support member 112 to a vertical position higher than the passenger cab of the truck 10.

The left and right stop members 138 and 158 are capable of assuming raised and lowered configurations relative to the forward horizontal support member. In FIG. 2A, wherein the forward support assembly assumes the stowed configuration, the stop members are lowered such that no portions thereof are raised above the forward horizontal support member. In FIGS. 1 and 2B-2C, however, the stop members are raised to prevent any cargo items disposed between the stop members along the horizontal support member from sliding past the stop members. Thus the stop members may be raised for assisting to maintain cargo items on the horizontal support member, and, the stop members may be lowered to reduce the overall appearance of the forward support assembly and to restore the aesthetic appearance of the truck 10. The lowered configurations of the stop members may also be preferred when supporting cargo items that might be damaged by raised stop members. For example, if a sheet of material known as dry-wall material and sheet-rock material is to be supported by the forward support assembly, lowering of the stop members may be preferred.

As shown in FIG. 1, the forward support assembly 110 further comprises an additional forward horizontal support member 122. The additional horizontal support member is connected to upper margins of the left and right first elevating members 134 and 154 and travels at least vertically as the forward support assembly is stowed and deployed. When the forward support assembly assumes the stowed configuration of FIG. 2A, the additional horizontal support member 122 is received at least partially within an elongate channel 17 (FIG. 1) defined by the front wall. The additional horizontal support member provides additional stability and rigidity to the forward support assembly 110, and further serves to optionally support cargo items above the cargo bed and below the forward horizontal support member 112.

As shown in FIG. 2B, the forward horizontal support member 112 has a contoured lower surface that defines a channel 114 opening downward to receive upper edges of the front wall 16 of the cargo bed 12 when the forward support assembly assumes the stowed configuration (FIG. 2A). Thus, the forward horizontal support member acts as an elongate cap that covers the channel 17 defined by the front wall when the forward support assembly assumes the stowed configuration.

As shown in FIG. 1, the rear support assembly 210 comprises a rear horizontal support member 212 that is disposed above the tailgate 14 for supporting items above the tailgate or otherwise expanding the dimensional capacities of the bed 12. The rear support assembly is shown having assumed a deployed configuration in FIG. 1 such that the rear horizontal support member 212 is disposed above the tailgate, vertically spaced from the tailgate. The rear support assembly is also capable of assuming a stowed configuration, as shown in FIG. 2A, such that the rear support assembly is disposed at least partially within the tailgate. Thus, the rear support assembly can be deployed as shown in FIG. 1 to serve in supporting cargo items such as ladders and kayaks above the tailgate, and can assume a stowed configuration as shown in FIG. 2A to minimize the appearance of the assembly and to reduce aerodynamic drag on the rear support assembly when the truck 10 travels.

The rear support assembly comprises a rear pair of elevating assemblies 232 (FIG. 3) and 252 that are spaced from each other along the lateral axis 11. The elevating assemblies 232 and 252 are at least partially disposed within the tailgate 14 when the rear support assembly assumes the stowed configuration as shown in FIG. 2A. The rear elevating assemblies comprise respective telescoping members. That is, the left rear elevating assembly 232 comprises a first elevating member 234, a second elevating member 236, and an upper most stop member 238, which members are configured to telescopically expand (FIG. 2C) and collapse (FIG. 2A) the left rear elevating assembly. Similarly, the right rear elevating assembly 252 comprises a first elevating member 254, a second elevating member 256, and an upper-most stop member 258, which members are configured to telescopically expand (FIG. 2C) and collapse (FIG. 2A) the right rear elevating assembly. Like the forward stop members 138 and 158, the left and right rear stop members 238 and 258 are capable of assuming lowered (FIG. 2A) and raised (FIG. 2C) configurations.

When the rear support assembly 210 assumes the stowed configuration as shown in FIG. 2A, the left and right first elevating members 234 and 254 are at least partially received by the tailgate 14 of the cargo bed 12, the left and right second elevating members 236 and 256 are respectively received at least partially by the left and right first elevating members 234 and 254, and the upper-most left and right stop members 238 and 258 are respectively received at least partially by the left and right second elevating members 236 and 256. The rear horizontal support member 212 is connected to upper margins of the left and right second elevating members 236 and 256 and travels at least vertically as the rear support assembly is stowed and deployed.

In the illustrated embodiment, the rear support assembly 210 is capable of assuming a plurality of deployed configurations. For example, in FIG. 2B the second elevating members 236 and 256 are respectively telescopically extended from the first elevating members 234 and 254 to dispose the rear horizontal support member in a vertical position raised over the tailgate 14. In FIG. 2C, the first elevating members are extended from the tailgate to further elevate the rear horizontal support member 212.

In the embodiment illustrated in FIGS. 1-3, the rear support assembly 210 further comprises an additional rear horizontal support member 222. The additional horizontal support member is connected to upper margins of the left and right first elevating members 234 and 254 and travels at least vertically as the rear support assembly is stowed and deployed. When the rear support assembly assumes the stowed configuration of FIG. 2A, the additional horizontal support member 222 is received at least partially within an elongate channel 15 defined by the tailgate. The additional horizontal support member provides additional stability and rigidity to the rear support assembly 210, and further serves to optionally support cargo items above the cargo bed and below horizontal support member 212.

As shown in FIG. 2B, the rear horizontal support member 212 has a contoured lower surface that defines a channel 214 opening downward to receive upper edges of the tailgate 14 of the cargo bed 12 when the rear support assembly assumes the stowed configuration (FIG. 2A). Thus, the rear horizontal support member acts as an elongate cap that covers the channel 15 defined by the tailgate when the rear support assembly assumes the stowed configuration.

As the tailgate 14 pivots to assume vertical (FIG. 1) and horizontal (FIG. 4) dispositions, the rear support assembly 210 pivots and travels with the tailgate. The rear support assembly 210 is generally capable of assuming the stowed and deployed configurations thereof without regard to the disposition of the tailgate. That is, the rear support assembly can be deployed when the tailgate assumes the vertical disposition as shown in FIG. 1 to serve in supporting cargo items above the tailgate. Furthermore, the rear support assembly can be deployed when the tailgate assumes the horizontal disposition as shown in FIG. 4 to increase the effective floor capacity of the cargo bed 12 beyond the horizontally disposed tailgate so that an item 25, such as a mattress, that is longer than the longitudinal walls 18 and 20 can be carried by the truck 10.

Figure 5:
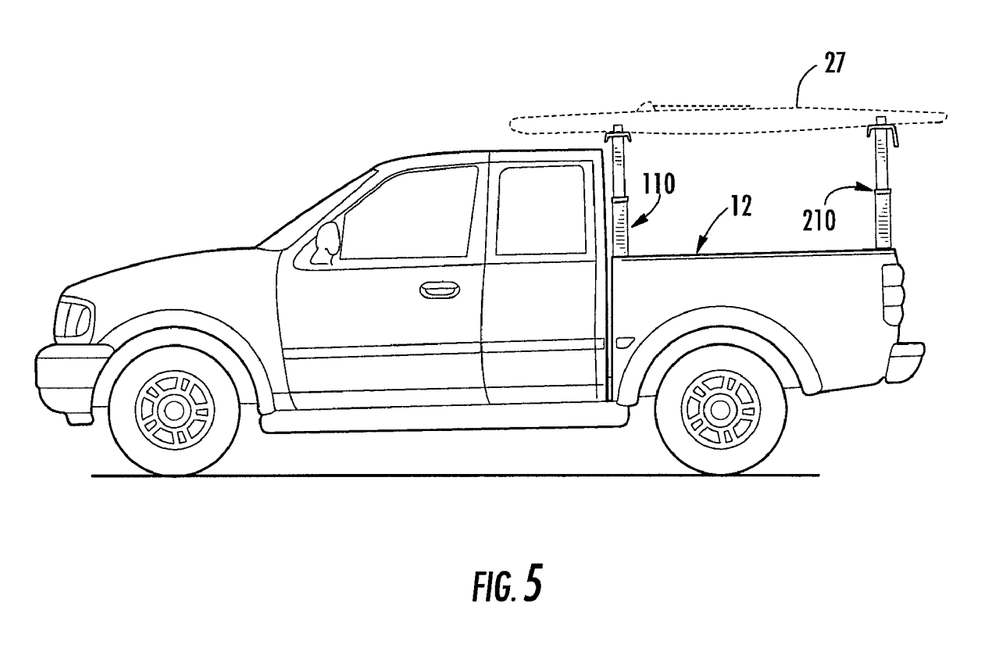
FIG. 5 is a side elevation view of a cargo support apparatus, according to an embodiment of the invention, supporting a long cargo item above the diminished cargo bed and spacious passenger cab of a truck.

The forward and rear support assemblies can be stowed and deployed independently of each other. For example, in FIG. 4, the rear support assembly 210 is deployed to increase the effective floor capacity of the cargo bed 12 beyond the horizontally disposed tailgate 14 while the forward support assembly remains stowed. The forward and rear support assemblies are capable of assuming respective deployed configurations such that the forward horizontal support member and the rear horizontal support members can be maintained at a common height as shown in FIG. 2B for supporting cargo items in horizontal dispositions spanning the truck bed. This may be particularly advantageous when the cargo support apparatus 100 is to be used to increase the effective dimensional capacities of the diminished cargo bed of a truck having a spacious passenger cab as shown in FIG. 5. In particular, in FIG. 5 a long cargo item 27, such as a kayak, spans the truck bed and is too long to fit within the diminished bed. The long cargo item 27 is supported above the cargo bed by the forward and rear support assemblies 110 and 210. Indeed, the forward and rear support assemblies are so extended as to support the cargo item above the passenger cab of the illustrated truck.

Figure 6:
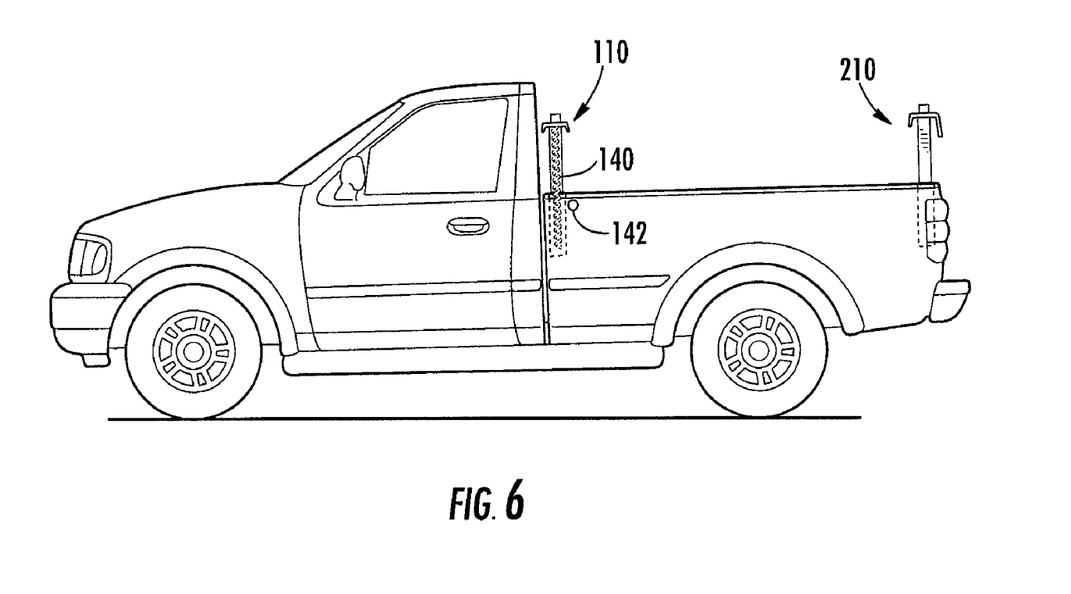
FIG. 6 is a side elevation view of a cargo support apparatus, according to an embodiment of the invention, illustrating a biasing member such as a spring disposed within a forward support assembly.

The forward and rear support assemblies may comprise respective biasing members for biasing the assemblies toward their deployed or stowed configurations. For example, as shown in FIG. 6, the forward support assembly 110 comprises an elongate biasing member 140, such as a spring, that is respectively compressed and expanded when the forward support assembly assumes stowed and deployed configurations. In FIG. 6, the biasing member 140 is disposed within the telescoping elevating members of the forward support assembly and persistently biases the forward support assembly toward deployed configurations. Thus, the biasing member assists a user in lifting the assembly toward elevated deployed configurations.

The forward and rear support assemblies may further comprise actuatable releasing and locking members. For example, in FIG. 6, the forward support assembly 110 comprises a release member 142, such as a spring-loaded button, that releases movements of the forward support assembly when depressed, and that locks the assembly from moving when not depressed. Thus, in the embodiment of FIG. 6, the forward support assembly 110 is telescopically released to assume a biased deployed configuration from a stowed configuration when the release member 142 is depressed, and is locked into its tentative disposition when the release member is not depressed.

The cargo support apparatus 100 may be constructed of various materials including metals such as steel and aluminum, and including composite materials such as fiberglass and carbon fiber composite materials. The horizontal support members may include gripping members and gripping textures along upper surfaces thereof to provide traction to minimize the likelihood of cargo items sliding along the support members.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cargo support apparatus for a truck bed, the truck bed having a front wall and a pivoting rear tailgate, the support assembly comprising:
   a forward support assembly capable of assuming a stowed configuration and at least one deployed configuration, the forward support assembly disposed at least partially within the front wall of the truck bed when assuming the stowed configuration, the forward support assembly including a forward horizontal support member disposed above the front wall for supporting cargo above the front wall when the forward support assembly assumes the at least one deployed configuration; and
   a rear support assembly capable of assuming a stowed configuration and at least one deployed configuration, the rear support assembly attached to and pivoting with the pivoting rear tailgate of the truck bed, the rear support assembly disposed at least partially within the tailgate when assuming the stowed configuration, the rear support assembly including a rear horizontal support member extending from the tailgate for supporting cargo beyond the tailgate when the rear support assembly assumes the at least one deployed configuration.

2. The cargo support apparatus of claim 1, wherein the forward support assembly and the rear support assembly are capable of assuming their stowed and deployed configurations independently of each other.

3. The cargo support apparatus of claim 2, wherein the forward and rear support assemblies are capable of assuming respective deployed configurations such that the forward horizontal support member and the rear horizontal support member can be maintained at a common height for supporting long cargo members in horizontal dispositions spanning the truck bed.

4. The cargo support apparatus of claim 1, the forward support assembly further comprising a pair of spaced forward elevating members supporting the horizontal support member when the forward support assembly assumes the at least one deployed configuration.

5. The cargo support apparatus of claim 4, wherein portions of the forward elevating members are disposed within the front wall of the truck bed when the forward support assembly assumes the stowed configuration.

6. The cargo support apparatus of claim 5, wherein the forward elevating members comprise telescoping members.

7. The cargo support apparatus of claim 6, wherein each said forward elevating member further comprises a stop member capable of assuming at least one raised configuration, each said stop member having at least a portion raised above the forward horizontal support member when assuming the raised configuration for preventing cargo supported by the forward horizontal member from sliding past the stop member.

8. The cargo support apparatus of claim 7, wherein each said stop member is further capable of assuming a lowered configuration, each said stop member having no portion raised above the forward horizontal support member when assuming the lowered configuration.

9. The cargo support apparatus of claim 1, wherein the forward support assembly further includes a spaced pair of stop members extending upwardly from the forward horizontal support member for preventing cargo disposed between the stop members from sliding past the stop members.

10. The cargo support apparatus of claim 9, wherein each said stop member is capable of assuming a lowered configuration and a raised configuration, each said stop member extending upwardly from the forward horizontal support member when assuming the raised configuration thereof, each said stop member having no portion raised above the forward horizontal support member when assuming the lowered configuration thereof.

11. The cargo support apparatus of claim 1, the forward support assembly further including an additional horizontal member disposed below the forward horizontal support member, the additional horizontal member assuming a position vertically adjacent the forward horizontal support member when the stowed configuration is assumed by the forward support assembly, the forward support assembly capable of assuming at least one deployed configuration with the additional horizontal member assuming a position vertically spaced from the forward horizontal support member.

12. The cargo support apparatus of claim 11, wherein, when the stowed configuration is assumed by the forward support assembly, the additional horizontal support member is received at least partially within an elongate channel defined by the front wall.

13. The cargo support apparatus of claim 1, wherein the forward support assembly is capable of assuming a fully deployed configuration to dispose the forward horizontal support member higher than a passenger cab forward of the truck bed.

14. The cargo support apparatus of claim 1, wherein the forward horizontal support member has a lower surface defining a channel receiving an upper edge of the front wall when the forward support assembly assumes the stowed configuration.

15. The cargo support apparatus of claim 1, wherein the rear horizontal support member has a lower surface defining a channel receiving an upper edge of the tailgate when the rear support assembly assumes the stowed configuration.

16. The cargo support apparatus of claim 1, wherein the forward support assembly further includes a biasing member that biases the forward support assembly toward the at least one deployed configuration.

17. The cargo support apparatus of claim 16, wherein the biasing member comprises a spring.

18. The cargo support apparatus of claim 16, wherein the forward support assembly further includes at least one actuatable release member adapted such that the forward support assembly is forced by the biasing member to assume the at least one deployed configuration when the release member is actuated.

19. A cargo bed for an automobile, the cargo bed comprising:
- a fixed vertical forward wall;
- a rear tailgate spaced from the forward wall, the tailgate capable of being pivotally disposed into a horizontal disposition and a vertical disposition, the tailgate defining a vertical rear wall parallel to the forward wall when the tailgate is disposed in the vertical disposition;
- a forward support assembly connected to the forward wall, the forward support assembly comprising a pair of spaced forward elevating members and a forward horizontal member connected to the pair of forward elevating members, the forward elevating members capable of being disposed at least partially within the forward wall such that the forward horizontal member is disposed proximal the forward wall, the forward elevating members further capable of being vertically extended from the forward wall such that the forward horizontal member is spaced from and disposed above the forward vertical wall;
- a rear support assembly connected to the tailgate, the rear support assembly comprising a pair of spaced rear elevating members and a rear horizontal member connected to the pair of rear elevating members, the rear elevating members capable of being disposed at least partially within the tailgate such that the rear horizontal member is disposed proximal the tailgate, the rear elevating members capable of being extended from the tailgate such that the rear horizontal member is spaced from the tailgate.

20. The cargo bed of claim 19, wherein the forward wall defines a forward channel such that the forward support assembly is capable of being disposed at least partially within the forward channel, and wherein the tailgate defines a rear channel such that the rear support assembly is capable of being disposed at least partially within the rear channel.

* * * * *